Oct. 27, 1936.  C. M. TUTTLE  2,058,531
CAMERA DIAPHRAGM CONTROL
Filed Feb. 8, 1934  2 Sheets-Sheet 1

Inventor:
Clifton M. Tuttle,
By Rolla N. Carter
Attorneys

Oct. 27, 1936.  C. M. TUTTLE  2,058,531
CAMERA DIAPHRAGM CONTROL
Filed Feb. 8, 1934  2 Sheets-Sheet 2

Inventor:
Clifton M. Tuttle,
Newton N. Perrins
By Rolla N. Carter
Attorneys

Patented Oct. 27, 1936

2,058,531

UNITED STATES PATENT OFFICE 2,058,531

CAMERA DIAPHRAGM CONTROL

Clifton M. Tuttle, Rochester, N. Y., assignor, by mesne assignments, to Eastman Kodak Company, Jersey City, N. J., a corporation of New Jersey Application February 8, 1934, Serial No. 710,259

6 Claims. (Cl. 88—16)

My invention relates to light sensitive apparatus and has particular relation to apparatus of a type utilized to control the transmission of light in one beam in accordance with the light received at some particular point. It is an object of my invention to provide an improved system of this character which is simple in construction, reliable in operation and particularly adapted to control the intensity of an exposure in photographic apparatus.

In photographing scenes under constantly changing lighting conditions it is very difficult for even a skilled operator to judge correctly the exposure which is proper for the existing conditions and although the range of present day films is so great that most amateurs can judge exposures with sufficient accuracy to obtain acceptable results it is highly desirable to provide them with apparatus with which the best result possible under any given condition may be secured without requiring a substantial time interval for making measurements and calculating camera settings.

It is, accordingly, an object of my invention to provide, for photographic cameras, a device which automatically takes cognizance of the existing lighting condition and translates it into a setting of the exposing mechanism of the camera whenever the operating lever of the camera is actuated to make an exposure.

In accordance with my invention I bias the movable element of a light limiting device to one extreme position and resiliently attach it to the exposure operating lever of the camera so that initial movement of this lever will move the element to its other extreme position after which further movement of the lever actuates the camera exposure mechanism. By inserting an obstacle at some point in the path of the movable element of the light limiting device, which will hereinafter be referred to as a diaphragm, its movement will be arrested without arresting the movement of the operating lever due to the resilient connection between them. Obviously if the position of this obstacle relatively to the movable element can be adjusted in strict accordance with the prevailing light conditions then the light transmission or opening of the diaphragm at the time its movable element is arrested will be such that an exposure made at this opening will be the correct one, provided other fixed factors such as shutter speed, speed of the film, etc., have been included in setting up the constants of the device. To regulate the positioning of this obstacle, I provide a light sensitive element connected to a suitable meter element and utilize the meter pointer as the obstacle. With this arrangement the pointer of a meter actuated by a light sensitive cell mechanically limits the diaphragm opening to a value which is a function of the intensity of the light received by the cell.

Other features and advantages of my invention will appear from the following description taken in connection with the accompanying drawings, and its scope will be pointed out in the appended claims.

I have illustrated and will describe my invention as applied to a hand motion picture camera, although it will be understood that the same control arrangement is equally applicable to professional cameras and to still cameras and in fact may be used wherever it is desired to control or regulate the size of an aperture in accordance with the light conditions prevailing at a point of interest.

Figure 1:
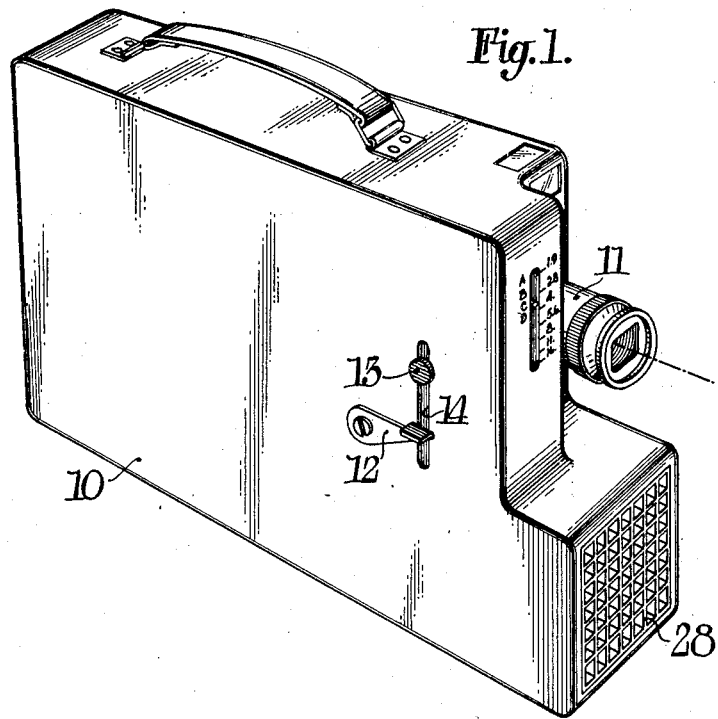
Fig. 1 is a view in perspective of a motion picture camera constructed according to my invention.

In Fig. 1, I have shown a motion picture camera 10 having the usual objective 11 and an ordinary release lever 12 and provided with an auxiliary control button 13 which is located for convenient operation by the thumb of the hand supporting the forward end of the camera 10. The button 13 is mounted for vertical movement in a slot 14 provided in one wall of the camera 10 and is normally held at the upper end of the slot 14. As will be fully described below, initial downward movement of the button 13 automatically adjusts the diaphragm of the objective 11 to the opening proper for the prevailing light conditions after which continued downward movement of the button 13 actuates the camera release lever 12 to operate the camera 10.

The general arrangement and functional relationship of the various parts of the control system of my invention will be described with reference to Fig. 2 in which the light aperture to be adjusted is shown as comprising an iris diaphragm 15 provided with an arm 16 which is secured to the diaphragm leaves 17 in a manner well known in the art so that downward movement of the arm 16 decreases the opening defined by the leaves 17. The arm 16 is resiliently urged in a direction to hold the diaphragm at its maximum opening by a spring 18 which may be secured to any fixed portion 19 of the camera structure.

The arm 16, at its outer end is provided with a depending rod 20 upon which is slidably mounted the control button 13. The button 13 is connected to the arm 16 by a coiled spring 21 which requires a greater force to overcome its tension than the force necessary to overcome the tension of the spring 18 so that downward movement of the button 13 will cause a corresponding downward movement of the arm 16.

For controlling the opening to which the diaphragm 15 will be adjusted when the control button 13 is moved downward, the pointer 22 of a meter coil 23 is positioned to be deflected in the path of a plate member 24 depending from and secured to the arm 16. The plate member 24 is provided with a curved serrated edge adapted to engage a bent over portion of the pointer 22 and thereby prevent further downward movement of the arm 16, whereby the opening to which the diaphragm 15 will be adjusted is determined by the deflection of the pointer 22 which is biased to zero deflection by the usual spiral spring 22'.

The diaphragm adjustment is controlled in accordance with light conditions prevailing at any chosen point by positioning at this point a light sensitive element 25, which preferably may be a photo voltaic cell, connected by leads 26 to the meter coil 23. For regulating the sensitivity of the meter coil 23 to correspond to the sensitivity of the light sensitive element 25, an adjustable resistance 27 may be inserted in one of the leads 26 and a grid 28 may be positioned in front of the element 25 to limit the angle of the cone to light falling on the element 25.

If the apparatus is to be used under widely different conditions it is generally desirable to provide some means for controlling the amount or the wavelength of the light falling on the cell 25 such as varying the area of the cell surface to be exposed, varying the intensity of the light falling on the cell and varying the nature or wavelength of the light by selectively positioning filters in front of the cell 25. In Fig. 2 I have shown one such means as comprising an iris diaphragm 29, the leaves 30 of which are connected to an operating arm 31.

Figure 2:
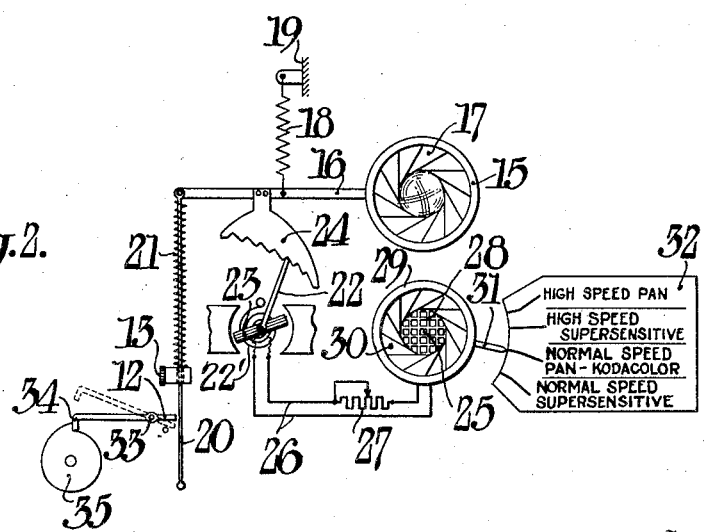
Fig. 2 is a diagrammatic view showing the essential elements of my improved arrangement.

The arrangement shown in Fig. 2 is primarily adapted for use in a camera such as is illustrated in Fig. 1 and when so used, the diaphragm 15 becomes the diaphragm of the camera, the aperture of which it is desired to adjust. To correlate the adjustment of the diaphragm 15 to the exposure time and the type of film used, a scale 32 is provided to indicate the proper adjustment of the cell diaphragm 29. As has been pointed out above, initial downward movement of the control button 13 moves the arm 16 against the tension of the spring 18 until the serrated plate 24 comes into engagement with the meter pointer 22, after which, continued downward movement of the control button 13 extends the coiled spring 21 and engages the release lever 12 to rotate it about its pivot 33 and thereby move its other end 34 out of the path of the notched cam 35 provided in the camera drive permitting it to rotate as is well known.

Figure 3:
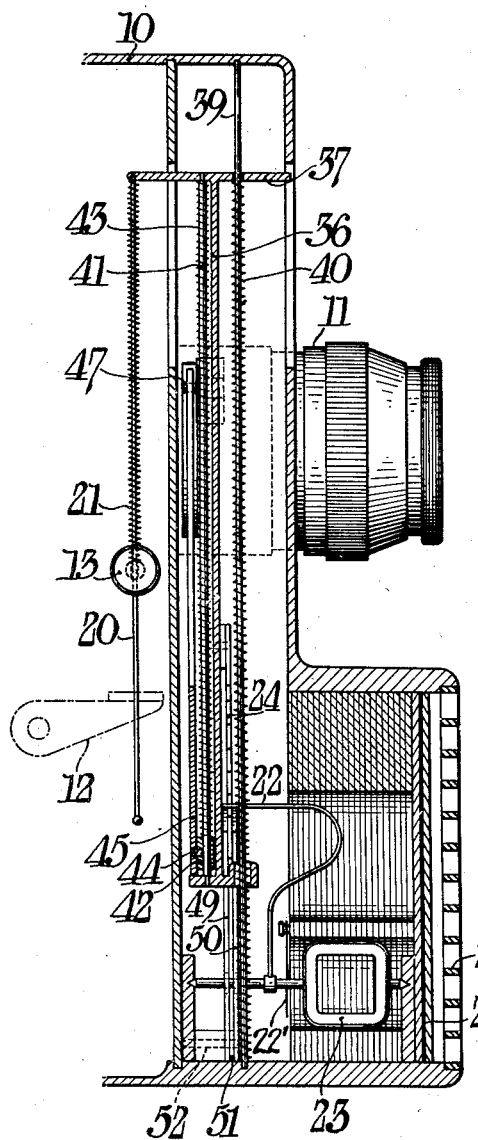
Fig. 3 is a sectional side elevation showing the diaphragm control mechanism of the camera shown in Fig. 1.
Figure 4:
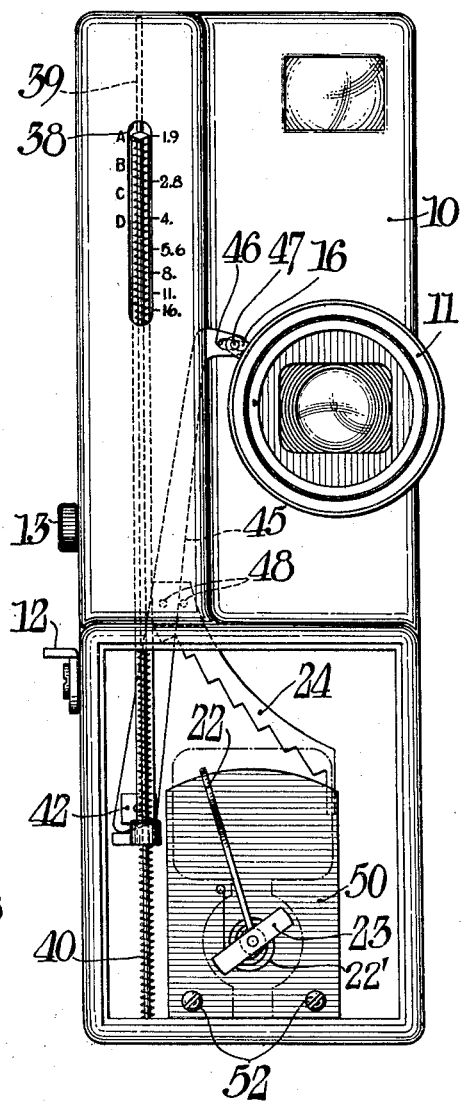
Fig. 4 is a front elevation of the camera illustrated in Fig. 1 with the light sensitive cell and meter magnet removed.

In Figures 3 and 4 a mechanical embodiment of the arrangement just described is shown as applied to a motion picture camera of the general type illustrated in Fig. 1, and wherever possible like reference characters are used to denote parts having the same function. For convenience, no means for modifying the light falling on the cell 25 is shown in these figures.

As shown, an I-shaped member 36 is provided at its upper end with a transverse plate 37 which supports at one of its ends the rod 20 and its other end extends into a vertical slot 38 formed in the front wall of the camera 10 and is adapted to cooperate with certain scales on the camera case to give a visual indication of the diaphragm adjustment. The member 36 is slidably mounted for vertical movement on a fixed rod 39 secured at its ends in the top and bottom of the casing of the camera 10. A compressed spring 40 surrounding the rod 39 and bearing against the bottom plate of the camera 10 and the under surface of the transverse plate 37, resiliently urges the I-shaped member 36 in an upward direction and normally retains it in the position shown in Figs. 3 and 4.

A second rod 41, anchored at its two ends in the heads of the I-shaped member 36, is provided with a sliding lug 42 which is resiliently held at the lower end of the rod 41 by a compressed spring 43. The lug 42 carries a pin 44 upon which is pivoted a link 45 provided at its upper end with an open slot 46 adapted to receive a pin 47 carried by the diaphragm adjusting arm 16. The compression spring 43 has sufficient strength to hold the lower end of the link 45 in contact with the lower transverse end of the I-shaped member 36 at all times unless the diaphragm of the objective is locked in a predetermined position to meet the aperture requirements of certain processes. When the diaphragm is so locked and the member 36 is moved downward the link 45 and the lug 42 remain stationary by overcoming the compression of the spring 43.

The stepped or serrated plate 24, which is adapted to cooperate with the meter pointer 22 to determine the diaphragm opening, is rigidly secured to the member 36 as by rivets 48 so that when the control button 13 is moved downwardly it acts through the tension of the spring 21 to move the I-shaped member 36 until the serrated plate 24 engages the pointer 22 after which, as above described, further movement of the button 13 extends the spring 21 without effecting further the diaphragm opening.

Since the needle pointer 22 will ordinarily be too delicate to stop by itself the movement of the serrated plate 24, I have provided a pair of parallel plates 49 and 50 spaced by washers 51 a distance sufficient to permit the passage therebetween of the serrated plate 24. The plates 49 and 50 are rigidly mounted on the camera structure by screws 52 and their upper ends are curved to conform to and lie immediately below the path followed by the horizontal end portion of the meter pointer 22. With this arrangement, the serrated plate 24 pushes the pointer 22 in its deflected position into contact with the upper ends of the spaced plates 49 and 50 whereby a relatively solid support is obtained and the plate 24 can be stopped without damage to the pointer 22.

It is evident from the drawings that the diaphragm control mechanism of my invention does not detract from the portability of a camera and in fact adds but very little to the size and weight of the camera. While my invention is not confined to any specific structure or arrangement of parts, I prefer an arrangement similar to the one illustrated because of its compactness and accessibility of the various parts.

Although the device of Figs. 3 and 4 functions the same as the arrangement diagrammatically shown in Fig. 2, its mechanical arrangement is somewhat different and to insure a complete understanding thereof its operation will now be described. With the camera pointed toward the scene to be photographed, light reflected by the scene and as restricted in angle by the grid 28 falls upon the photo-voltaic or other light sensitive cell 25 and causes the pointer 22 to be deflected against the bias of the spring 22' to a position corresponding to the intensity of the light coming from the scene and therefore corresponding to the intensity of the light falling on the camera objective. After the camera is pointed properly the control button 13 is moved downwardly until the lever 12 is depressed to release the exposing mechanism. That this exposure is proper is assured for the following reason. Initial movement of the control button 13 adjusted the diaphragm opening until arrested by the serrated plate 20 engaging the pointer 22 in its deflected position and because of the previously adjusted constants of the device the opening of the diaphragm when its adjustment was arrested was the proper one for the then prevailing light conditions.

My invention has been specifically illustrated hereinabove as applied to a photographic camera. Since it is primarily an arrangement for regulating the intensity of light at one point in accordance with the intensity of light prevailing at another point, my invention is equally applicable to other apparatus where it is desired to regulate the intensity of a beam of light.

While I have shown and described the diaphragms 15 and 29 as being of the iris type, it will be understood that these diaphragms may be of any suitable construction having a movable element for governing the transmission of light therethrough.

I have chosen the particular embodiment described above as illustrative of my invention and it will be apparent that various other modifications may be made without departing from the spirit and scope of my invention, which modifications I intend to cover by the appended claims.

What I claim as new and desire to secure by Letters Patent of the United States is:

1. A photographic camera including a diaphragm and a camera release, an element movable through a predetermined path and adapted to actuate said release as it approaches the end of said path, a member for adjusting the diaphragm, a yielding connection between the movable element and said member, whereby the diaphragm is adjusted when said element is moved through its path, adjustable means for stopping the movement of said member prior to the actuation of said release, a light-sensitive cell, and means energized by the cell for adjusting said stopping means.

2. In a motion picture camera having an objective, a diaphragm associated with the objective and a camera operating means, a movable element for adjusting the diaphragm, a stop member adjustable for variably limiting the movement of said element, a photoelectric device for adjusting the stop member, and manually actuatable means for moving said element into engagement with the stop member and thereafter actuating said operating means.

3. In a photographic camera having an objective, a diaphragm associated with the objective, and a camera operating lever, a movable element for adjusting the diaphragm, a stop member for limiting the movement of said element, a light sensitive cell, means actuated by the cell for adjusting the position of the stop member in accordance with the activation of the light sensitive cell, and means for moving said movable element into engagement with the stop member and thereafter actuating the camera operating lever.

4. In a photographic camera having an objective and means for governing the transmission of light through the objective, a movable element for adjusting said means, resilient means for biasing said element in one direction, means for moving said element in the other direction, a displaceable member for limiting the movement of said element in said other direction, a light sensitive cell, and means controlled by the cell for displacing said member in accordance with the prevailing light condition.

5. A motion picture camera including a diaphragm and means for exposing a sensitized film through the diaphragm, means for adjusting the diaphragm to vary the degree of exposure, a stop member for determining the extent to which the diaphragm may be adjusted, an indicating instrument for displacing the stop member, a light-sensitive cell connected to said instrument, whereby the stop member is displaced in accordance with the illumination to which the cell is exposed, an operating lever for said exposing means, an operating member adapted to be moved into engagement with and to actuate said operating lever, and yieldable motion transmitting means between the operating member and the diaphragm adjusting means, whereby the stopping of said adjusting means by the stop member does not interfere with the movement of said operating member.

6. In a motion picture camera provided with a lens and a camera release, the combination with an adjustable diaphragm for regulating the light transmitted by the lens, movable means for adjusting the diaphragm, spring means for normally holding the movable diaphragm adjusting means at one extreme adjustment, an operating element for sequentially moving said movable means towards its other extreme adjustment and actuating the camera release, a photo-electric device and means connected to said device for limiting said other extreme adjustment in accordance with the existing light.

CLIFTON M. TUTTLE.